United States Patent
Hug et al.

(10) Patent No.: US 7,389,936 B2
(45) Date of Patent: Jun. 24, 2008

(54) CARD HOUSING DEVICE

(75) Inventors: Klaus Hug, Oberndorf (DE); Torsten Wahler, Bad Duerrheim (DE)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 10/555,420

(22) PCT Filed: Mar. 24, 2004

(86) PCT No.: PCT/EP2004/003137

§ 371 (c)(1),
(2), (4) Date: Nov. 3, 2005

(87) PCT Pub. No.: WO2004/100047

PCT Pub. Date: Nov. 18, 2004

(65) Prior Publication Data

US 2006/0214002 A1      Sep. 28, 2006

(30) Foreign Application Priority Data

May 12, 2003    (DE) ................ 103 21 242

(51) Int. Cl.
*G06K 7/00* (2006.01)
(52) U.S. Cl. .......... 235/486; 235/441; 235/451; 235/492
(58) Field of Classification Search ........ 235/486, 235/492, 380, 441, 451
See application file for complete search history.

(56) References Cited

U.S. PATENT DOCUMENTS

| | | | |
|---|---|---|---|
| 4,800,551 A | 1/1989 | Norris | |
| 5,518,412 A | 5/1996 | Larabell | |
| 5,714,742 A * | 2/1998 | Ieda | ............. 235/441 |
| 5,729,000 A * | 3/1998 | Sugimoto | ............ 235/441 |
| 6,073,853 A | 6/2000 | Odic | |
| 6,234,391 B1 | 5/2001 | Reichardt et al. | |
| 6,267,295 B1 * | 7/2001 | Amagai et al. | ............. 235/486 |
| 6,367,700 B1 * | 4/2002 | Kanayama et al. | ........ 235/475 |
| 6,717,805 B2 | 4/2004 | Liu et al. | |
| 6,736,318 B2 | 5/2004 | Reichardt et al. | |
| 6,776,338 B2 * | 8/2004 | Watanabe | ............ 235/441 |
| 6,869,017 B2 | 3/2005 | Yamaguchi | |
| 6,951,473 B2 | 10/2005 | Takahashi et al. | |

(Continued)

FOREIGN PATENT DOCUMENTS

| | | |
|---|---|---|
| DE | 35 18 247 A1 | 11/1986 |
| DE | 92 13 283 U1 | 11/1992 |
| DE | 41 39 482 A1 | 6/1993 |
| DE | 43 15 746 A1 | 11/1994 |
| DE | 44 02 229 A1 | 7/1995 |

(Continued)

OTHER PUBLICATIONS

Derwent Abstract—D-35 18 247 A1; Nov. 27, 1986; Siemens Aktiengesellschaft, D-1000 Berlin und D-8000 München, Germany.

(Continued)

*Primary Examiner*—Seung H Lee

(57) ABSTRACT

A card housing device of flat construction is disclosed. The device allows for the complete insertion of a card through a narrow housing opening which may be sealed by a seal. The seal includes a sealing element which may be displaced in a direction normal to a displacement plane of the card. Conventional devices of this type are unsuitable for application in a tachograph due to installation requirements. The sealing element on the card housing device is spring-mounted by at least one elastic element.

19 Claims, 10 Drawing Sheets

U.S. PATENT DOCUMENTS

| | | | |
|---|---|---|---|
| 7,036,742 B2 * | 5/2006 | Learmonth et al. | 235/492 |
| 7,108,524 B2 | 9/2006 | Wahler | |
| 7,118,038 B2 * | 10/2006 | Miyazawa et al. | 235/453 |
| 2002/0117550 A1 * | 8/2002 | Hirasawa | 235/479 |
| 2004/0032709 A1 | 2/2004 | Liu et al. | |

FOREIGN PATENT DOCUMENTS

| | | |
|---|---|---|
| DE | 195 47 060 A1 | 6/1997 |
| DE | 198 09 619 A1 | 9/1999 |
| DE | 198 15 549 C2 | 4/2000 |
| DE | 199 47 162 C1 | 9/2000 |
| DE | 101 12 061 A1 | 10/2002 |
| EP | 0 363 992 A2 | 4/1990 |
| EP | 0 342 407 B1 | 6/1992 |
| EP | 1 017 013 A3 | 12/2002 |
| EP | 1 239 545 B1 | 2/2005 |
| FR | 2 801 393 A1 | 5/2001 |
| WO | WO 96/34427 | 10/1996 |

OTHER PUBLICATIONS

Derwent Abstract—FR-2 801 393 A1; May 25, 2001; Sagem SA Société anonyme, France.

Derwent Abstract—DE-43 15 746 A1: Nov. 17, 1994; Amphenol/Tuchel Electronics GmbH, Heilbronn, Germany.

Derwent Abstract—DE-44 02 229 A1; Jul. 27, 1995; Siemens Aktiengesellschaft, D-80333 München, Germany.

Abstract—DE-92 13 283 U1; Nov. 26, 1992; Siemens Aktiengesellschaft, D-8000 München, Germany.

Derwent Abstract—DE-41 39 482 A1; Jun. 3, 1993; Man Technologie Aktiengesellschaft; D-8000 München, Germany.

Derwent Abstract—DE-195 47 060 A1; Jun. 26, 1997; Vogler Bernhard, D-97353 Wiesentheid, Germany.

Derwent Abstract—EP 1 017 013 A3; Dec. 18, 2002; Siemens Aktiengesellschaft, D-80333 München, Germany.

Derwent Abstract—EP 0 342 407 B1; Jun. 3, 1992; Mannesmann Kienzle GmbH, W-7730 Villingen-Schwenningen, Germany.

Derwent Abstract—DE-199 47 162 C1; Sep. 28, 2000; ITT Manufacturing Enterprises, Inc.; Wilmington, Del., USA.

Derwent Abstract—DE-198 15 549 C2; Apr. 27, 2000; ITT Mfg. Enterprises, Inc.; Wilmington, Del., USA.

Derwent Abstract—DE-101 12 061 A1; Oct. 10, 2002; Mannesmann VDO AG, D-60388 Frankfurt, Germany.

Derwent Abstract—DE-198 09 619 A1; Sep. 9, 1999; Mannesmann VDO AG, D-60388 Frankfurt, Germany.

* cited by examiner

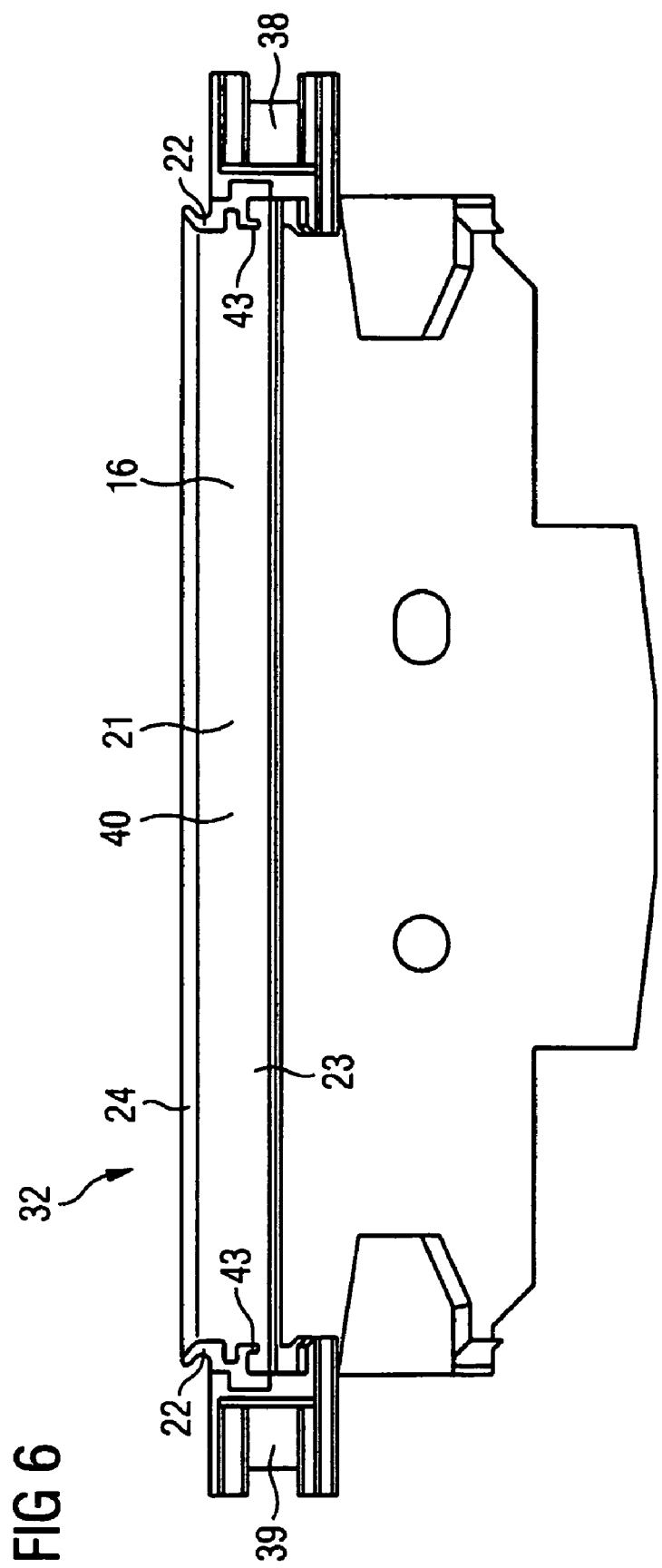

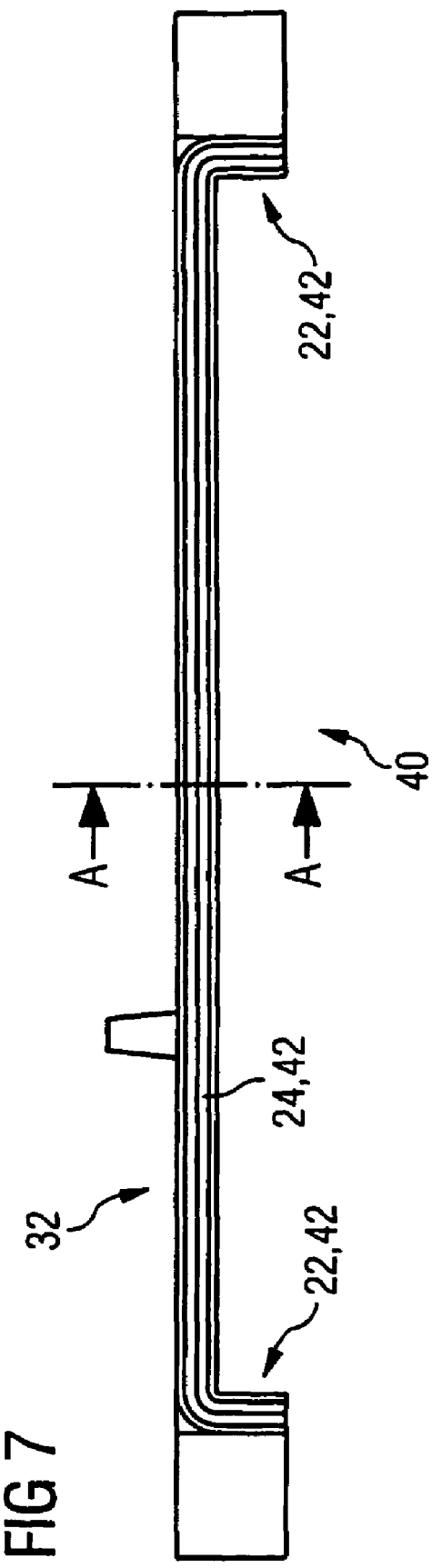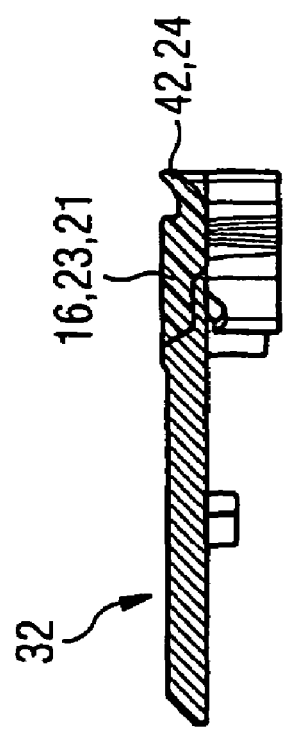

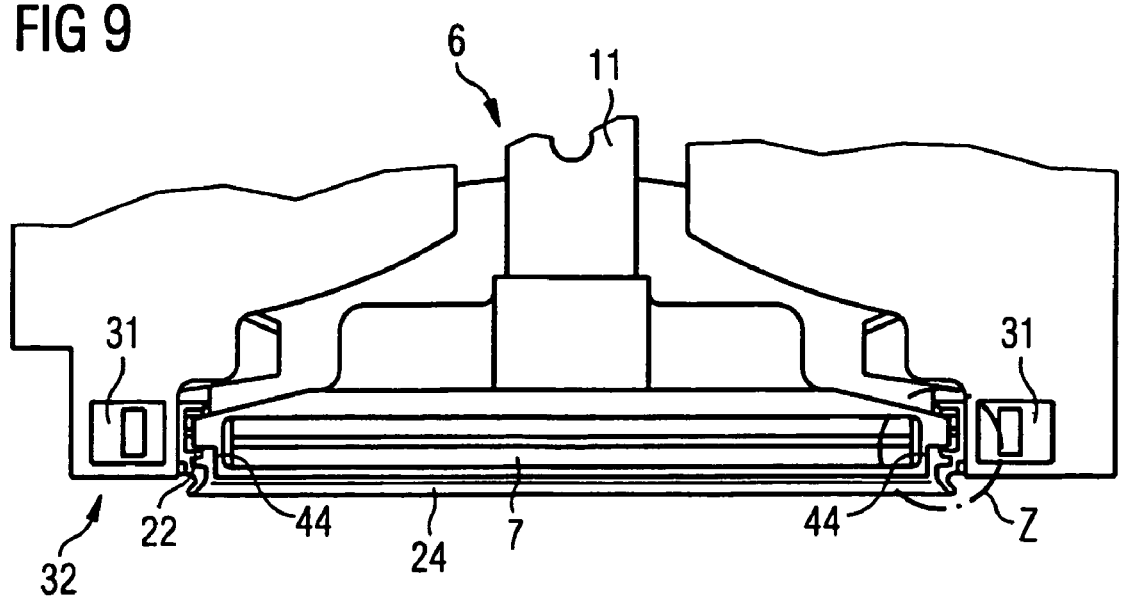
FIG 9
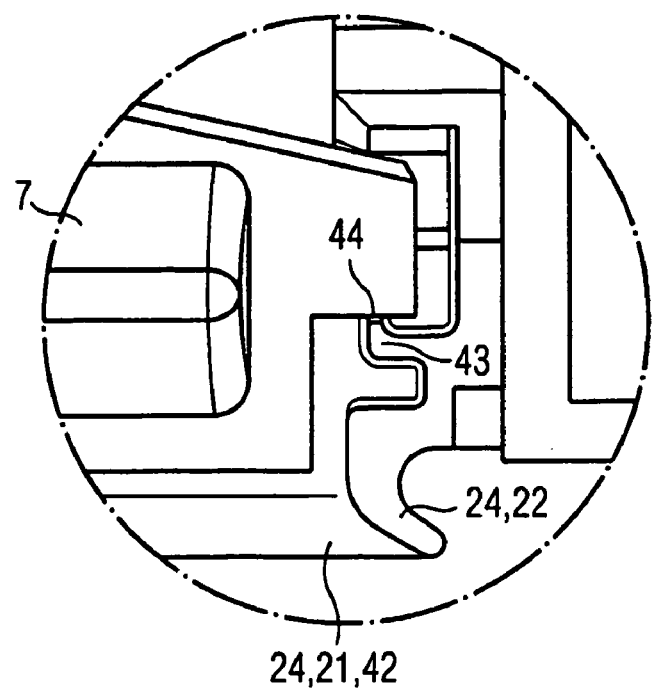
FIG 10  Z 10:1

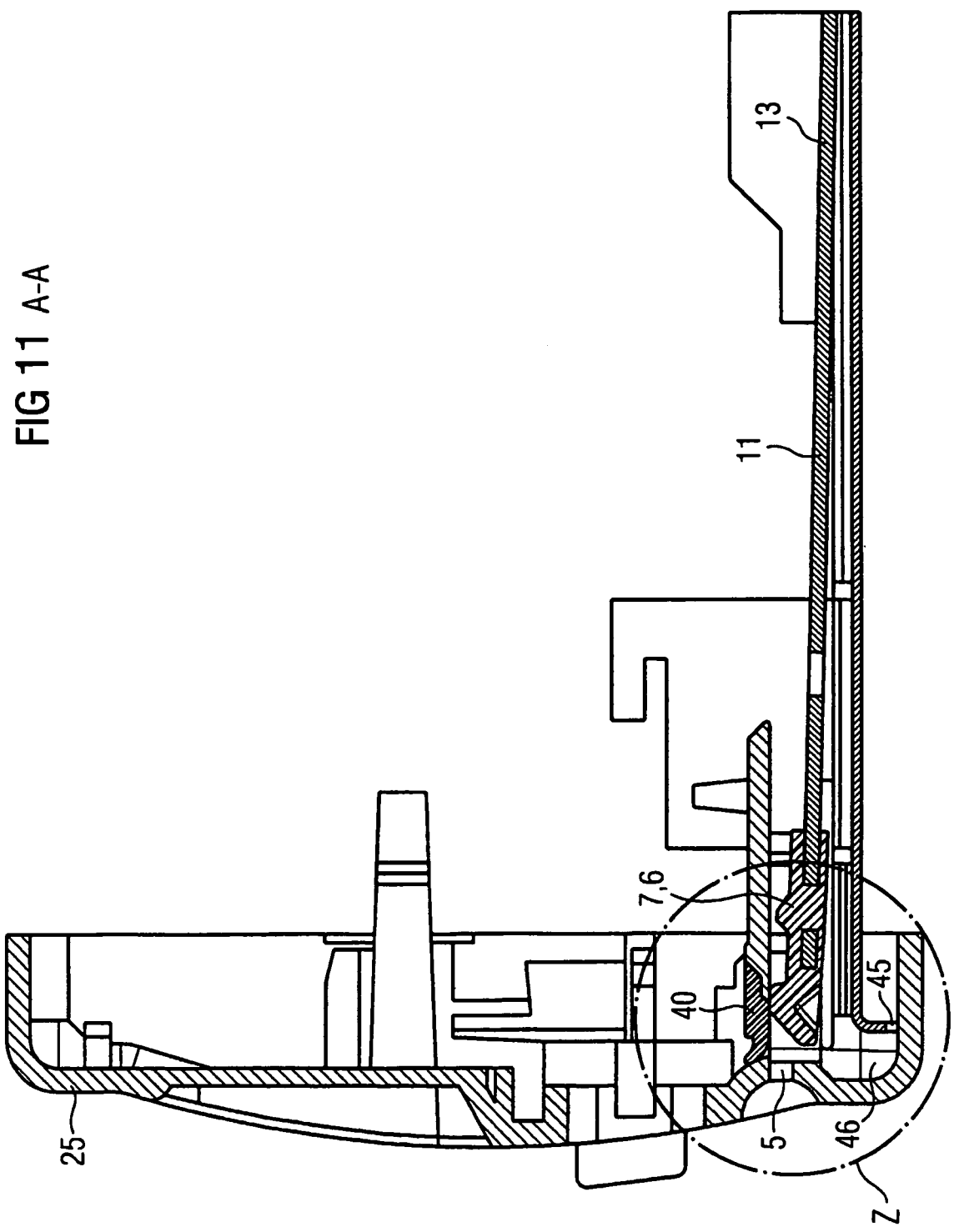
FIG 11 A-A

CARD HOUSING DEVICE

BACKGROUND OF THE INVENTION

The invention relates to a card receiving device, in particular for a tachograph in a motor vehicle of a flat construction, which completely draws in a card in a plane of movement, with an elongate receiving opening, through which the card reaches the card receiving device, and with a closure, which has a closure element, which extends in the longitudinal direction of the receiving opening and blocks the receiving opening in the closed position of the closure, the closure element being movable in a direction normal to the plane of movement within the travel required for the reception of the card.

The main focus of application of the device according to the invention lies in the area of tachographs or devices for recording the working periods and rest periods of commercial vehicle drivers. However, other applications are likewise feasible, for example in the area of banking and for making payments, or locking systems. The invention is advantageously used in combination with all types of card-like data storage media. On account of the great commercial and legal importance of the data which can be acquired with tachographs, the recordings have to be reliably secured against manipulation. The security measures relate both to data acquisition and data transmission and to the transmission and storage of the acquired data in the memory of the card. Relevant standards place strict requirements on the security standard to be achieved by the measures. It is therefore stipulated that the card should be entirely held by the card receiving device during the reading and writing operations and be isolated from the surroundings by means of suitable closure devices. The closure devices have to be arrested in the closed position during the reading and writing operations. Additional difficulties arise on account of operational failures in conventional devices caused by contamination, in particular by contact being interrupted or even when the card is being drawn in. It is problematical to draw in the card and position it exactly on the contacts of the device because the cards have high manufacturing tolerances in relation to the required positional accuracy with respect to the contacts of the device. Since the cards are predominantly perceived by the user to be distinguished by a high degree of robustness, said cards are generally not handled with the care that is actually required, so that, in addition to the tolerances caused by manufacture, deformation and damage impair the way in which the card operates when interacting with the card receiving devices. Furthermore, the operating conditions in motor vehicles place increased requirements on functional reliability on account of the pronounced vibrations and countless bumps and the wide-ranging temperature fluctuations. Implementing security against manipulation and the desired handling convenience mean it is necessary to draw in the card fully automatically. However, in order to meet this requirement, great difficulties are faced in terms of construction because the installation space available in a tachograph, which is the size of a car radio, provides only approximately a height of 10 mm for the fully automatic drawing-in process. An important application of the invention lies in the area of commercial vehicles, in particular transporters of hazardous materials, for which relevant protection classes are of central significance. For instance, protection against dust deposits, complete protection against contact with live or internal moving parts, protection against penetration by dust or protection against penetration by water splashing against the device from all directions is prescribed as an imperative requirement. These boundary conditions place special requirements on a closure of the receiving opening of a card receiving device.

European Patent Application EP 1 017 013 A3 already discloses a closing device for a device of a similar generic type in which a segmented drum blocks or releases the opening, the drum being controlled and driven by means of a suitable gear mechanism. On account of the great structural and production engineering complexity, the solution is not suitable for mass production. European Patent Specification EP 0 342 407 B1 already discloses a device in which a closure is movable in the generic way, but the proposed solution is extremely complex.

Devices of the generic type with a guillotine-like closing movement are nowadays found in most automated teller machines. The safety requirements in the case of these devices are comparable or even more stringent, manipulation being made more difficult already by the fact that these devices are under constant surveillance. However, the known technique cannot be transferred to a tachograph, because it does not meet the requirements in terms of installation space.

SUMMARY OF THE INVENTION

On the basis of the practical requirements and the problems and disadvantages of the prior art, it is the object of the invention to close a card receiving device by means of a closure in conformity with relevant protection classes, with at the same time a high degree of suitability for mass production, low production tolerances and a reliable operating mode.

The object is achieved according to the invention by a card receiving device of the type mentioned at the beginning in which the closure element is resiliently mounted on the card receiving device by means of at least one elastic element. The decisive advantage of the invention lies in the incomparably low complexity of the resilient mounting, which makes all additional mechanical components, in particular gear components, superfluous to the greatest extent. On account of its low structural complexity, the very simple solution is accompanied by great reliability and low production costs. At the same time as saving mechanically complex gear components, the installation space for the closure is reduced considerably, which is of extremely great interest in particular in the case of the installation space given in the area of motor vehicle tachographs, similar to the format of a car radio. An outstanding operating mode of the closure can be obtained with an overall height of less than 10 mm without involving any special complexity in terms of production engineering.

An advantageous development of the invention provides that the closure element has at least one extension arm, which extends in an inward direction of the card receiving device and is rotatably mounted in a first axis of rotation, so that the closure element performs a movement closing the receiving opening in a manner substantially similar to a guillotine within the travel required for the reception of the chip card. Without complex linear guidance but by means of an axis of rotation that is arranged away from the closure element, a reliable function can be obtained in this way at low cost. By contrast with linear guidance of the closure element, the mounting in an axis of rotation does not have any tendency to block, since the torques in the mounting increase with increasing distance from the closure element. Nevertheless, on account of the small travel of the closure element and the resultant small angle of rotation in the axis of rotation, a movement of the closure element that is to the greatest extent exclusively translatory can be ensured, which is likewise conducive to the reliable closing of the receiving opening, since contaminants that become attached to the closure or the adjacent bearing surfaces are not able to hinder the movement of the closure element, as they can for example in the case of a pivoting flap.

The advantages of the invention come to bear in particular if the closure element is attached to at least one leaf spring. The leaf spring may in this case advantageously extend substantially in a plane parallel to the plane of the card. In this way, in the case of a leaf spring of a preferred elongate configuration, the closure element moves in a manner that is substantially translatory and perpendicular to the plane of movement, so that an advantageous guillotine-like closure takes place. The decisive advantage lies in the saving of all the gear components, since the upstream leaf spring provides the arrangement with precisely the required degrees of freedom of movement. At the same time, the resilient mounting that is advantageous according to the invention is provided.

The greatest stability is achieved if the closure element is formed integrally with the leaf spring. At the same time, the number of components is reduced, with the effect of lowering cost. In this sense, further advantages are obtained if the leaf spring is part of a further, component-carrying, if appropriate central, carrier.

As already explained in respect of the example of the leaf spring, it is generally expedient if the closure element is resiliently mounted in a direction normal to the plane of movement within the travel required for the reception of the chip card. The advantages according to the invention arise from the combination of the resilient mounting in a direction normal to the plane of movement with a freedom of movement of the closure element that is oriented in a substantially translatory manner in a direction normal to the plane of movement. It should be pointed out that, as already proposed in the preferred embodiment, rotational movements by small angles do not restrict the success according to the invention as long as the movement of the closure element is substantially a translatory movement oriented perpendicularly in relation to the plane of movement. The ratio of the travel required for the reception of the card to the distance of an axis of rotation of the movement of the closure element located in the inward direction of the closure element is of significance here. This axis of rotation is advantageously arranged away from the closure element in the inward direction by at least ten times the usual travel of the closure element. The same applies to the fastening of one end of a leaf spring in connection with the closure element.

In order that the user can open a closure just by applying pressure by means of the card to be inserted, it is expedient if the closure element has on the input side a run-in slope for the card to be inserted that is located on the outside and extends in the longitudinal direction of the receiving opening. In the same way, it is expedient for the withdrawal of a card from the device according to the invention if the closure element has a run-in slope for the card to be pushed out that is located on the inside and extends in the longitudinal direction of the receiving opening.

Since, in particular in the area of commercial vehicles, it cannot be assumed that the cards to be received will be handled with care, it is expedient if, in the closed position, the closure element bears in an elastically prestressed manner against a counter abutment, during the inward movement into the card receiving device the card is arranged between the counter abutment and the closure element, is facing the closure element with a first flat side and is facing the counter abutment with a second flat side and the closure element is stressed against the flat side of the card facing the closure element. In this way, contaminants are stripped from the card by means of the closure element during the drawing-in movement. The stripping device may be provided both by the closure element and by the counter abutment. Since the closure element has preferred suitability for this stripping function, it is expedient if the card receiving device has a set of contacts for the contacting of the card that are arranged on the same side of the plane of movement as the closure element. In this way, the card is freed of contaminants particularly thoroughly on that flat side which comes into conducting connection with the contacts of the set of contacts in the end position. If the seal lying opposite the closure element is formed in a way making it suitable for stripping, it is in the same way advisable on account of the pressing force of the closure element for the same to be arranged on the side of the card opposite from the set of contacts.

In order that in particular no splash water can penetrate into the device, it is advisable if, in the closed position, the closure element bears against a first seal extending in the longitudinal direction of the receiving opening. For further protection from splash water, it is additionally expedient to provide the receiving opening with a second seal in the transverse direction, against which the closure element bears in the closed position. Additional savings and a reduction in the number of components are obtained if the first seal, extending in the longitudinal direction of the receiving opening, forms with the second seal, extending in the transverse direction of the receiving opening, a component that can be used as strip material, if appropriate under elastic deformation, or already has a correspondingly shaped contour.

For a pleasing external appearance, it is advisable to provide the device with a front panel, which has a rear side and a visible side and is provided in the region of the receiving opening of the card receiving device with a recess, which is at least partially surrounded on the rear side by a third seal, which seals with respect to the front side of the card receiving device in the region of the receiving opening, so that neither splash water nor dust can penetrate. This third seal expediently forms a component with the seal already sealing with respect to the closure element, so that the card receiving device has a front panel with a rear side, a visible side and with a recess in the region of the receiving opening the card, the cross section of the seal has a harder region, which extends in the longitudinal direction and against which the closure element bears in the closed position, and a softer region, which bears against the rear side of the panel.

For the case in which water happens to get between the actual card receiving device and the front panel in spite of the seal, it is advisable if the panel has underneath the recess at least one drainage opening.

It is expedient both for the automatic opening of the closure element on the basis of a pressure applied by means of the card to be received and also for a better sealing effect of the closure if the closure element has a cross section that tapers in the form of a wedge or runs to a point in relation to the seal, so that a substantially linear contact is obtained between the seal and the closure element in the closed position.

To make allowance for relevant legal standards for tachographs, it is advisable if the card receiving device has a locking unit, which locks the closure in the closed position. In the case of resilient mounting of the closure element by means of a leaf spring, it is of particular advantage if the locking element of the locking unit blocks the leaf spring in the closed position. The advantages of the invention come fully to bear if the card can be automatically drawn into the card receiving device or withdrawn.

BRIEF DESCRIPTION OF THE SEVERAL VIEWS OF THE DRAWINGS

The invention is explained in more detail below to illustrate it on the basis of a specific exemplary embodiment and with reference to drawings, in which:

FIG. 6 shows a plan view of an arrangement according to the invention of seals on a closure according to the invention;

FIG. 7 shows a front view of the sealing arrangement of FIG. 6;

FIG. 8 shows a section through an arrangement according to the invention of a seal along the section A-A represented in FIG. 7;

FIG. 9 shows a view from below of a closure element according to the invention together with a sealing arrangement according to the invention;

FIG. 10 shows a detailed representation according to the detail Z indicated in FIG. 9;

FIG. 11 shows a longitudinal section through a closure according to the invention together with a front panel of a card receiving device;

DETAILED DESCRIPTION OF THE INVENTION

Figure 1:
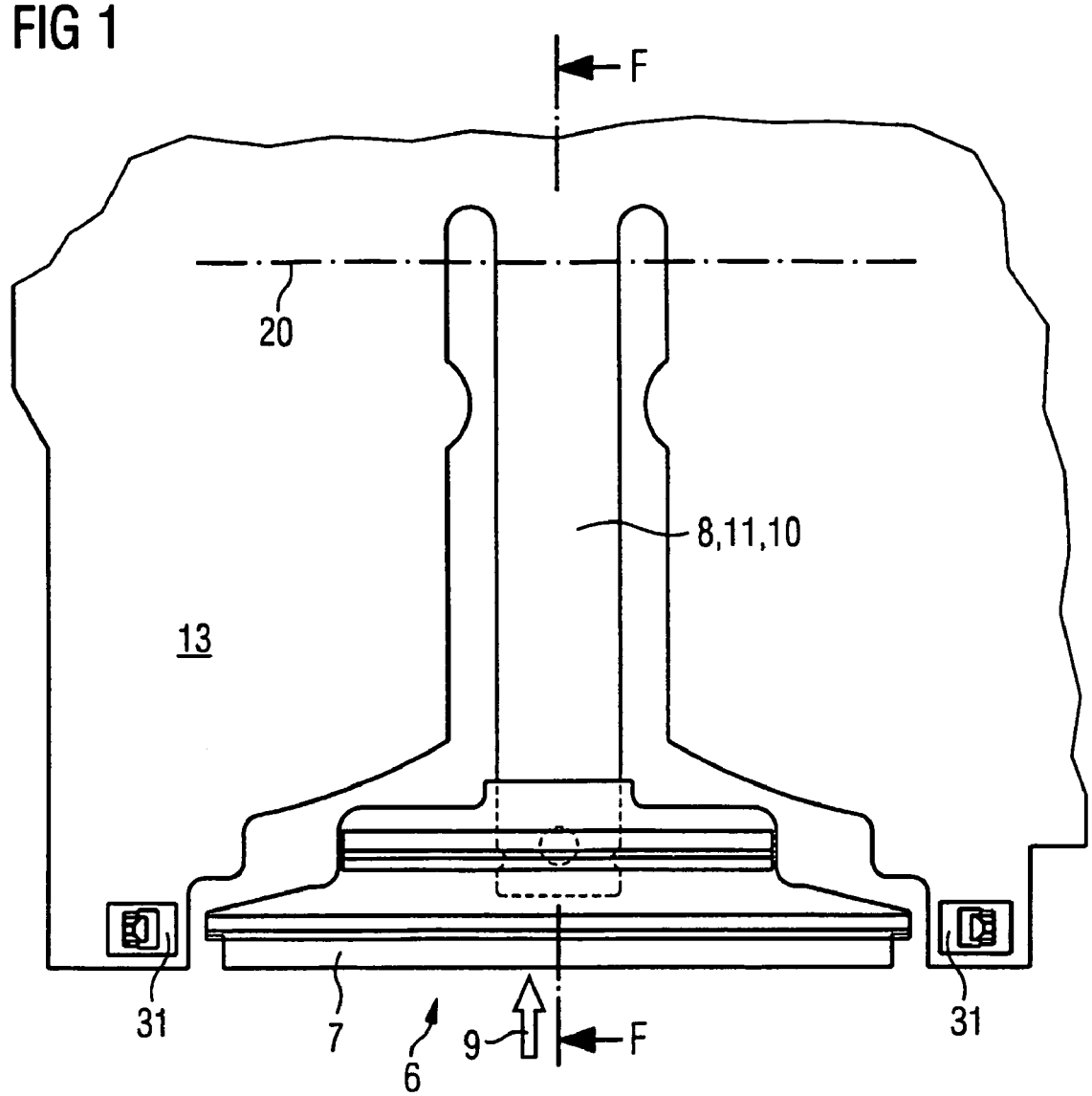
FIG. 1 shows a plan view of the closure according to the invention as a component part of a carrier.

In FIG. 1, a closure element 7 according to the invention of a closure 6 is provided with the designation 7 and is represented together with an elastic element 8, formed as an extension arm 10, or a leaf spring 11 on a carrier 13. The carrier 13 and the leaf spring 11 are punched out from a metal sheet and the closure element 7 is molded as a plastic part onto the end of the leaf spring 11 on the input side. Likewise molded onto the carrier 13 are latching hooks 31 for the mounting of a sealing unit 32, represented in FIGS. 6 to 12. On account of the low amplitude, the movement of the closure element 7 of the closure 6 can be described by approximation as a rotation about a first axis of rotation 20, which is arranged in the region of the attachment of the leaf spring 11 and runs parallel to a plane of movement 4 of a card 2.

Figure 2:
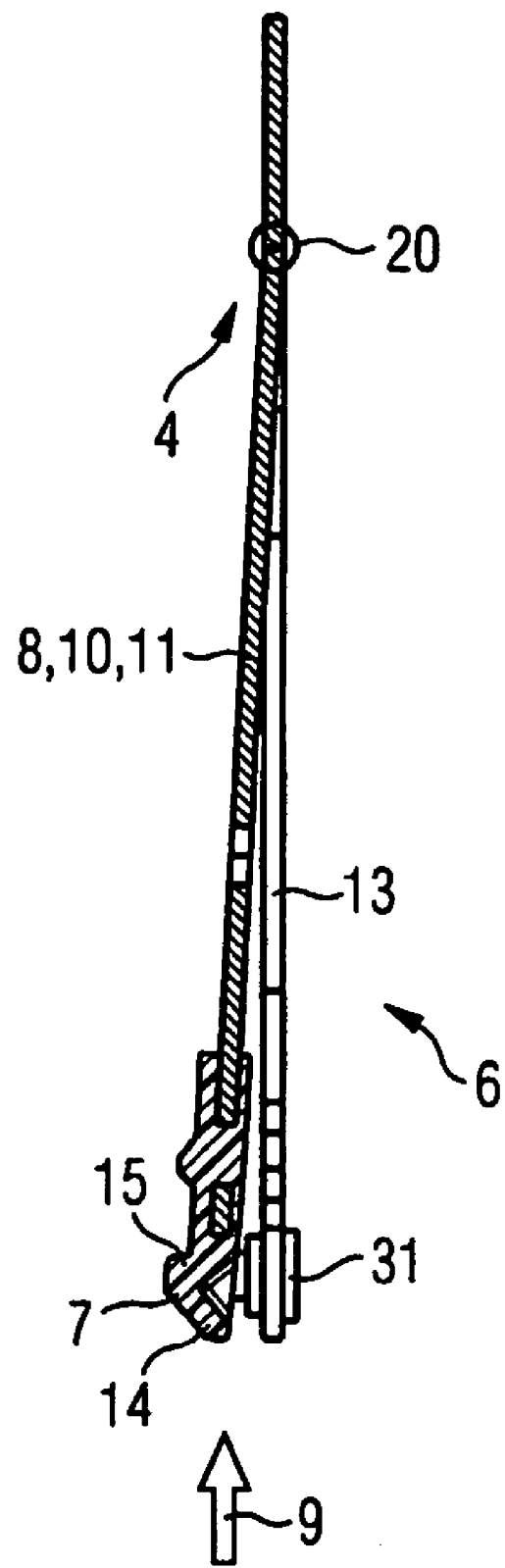
FIG. 2 shows a longitudinal section through a closure element of a closure according to the invention with a formed-on leaf spring.
Figure 3:
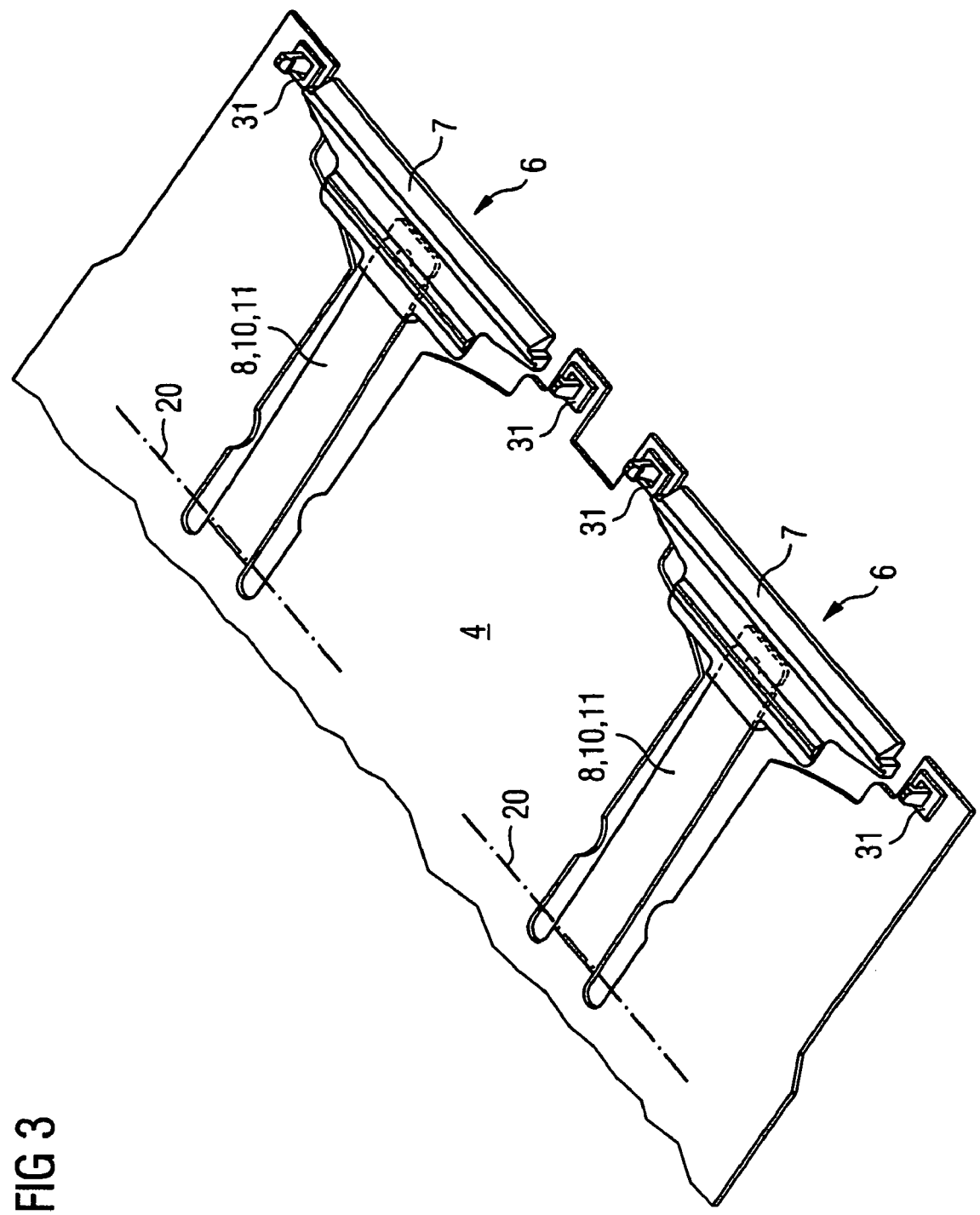
FIG. 3 shows a perspective representation of two closures according to the invention, arranged on a common carrier.

As also shown in FIGS. 2, 3, the closure element 7 has on the input side, in an inward direction 9, an outer run-in slope 14. By means of the outer run-in slope 14, the card is capable of pushing aside the closure element 7 from a receiving opening 5 perpendicularly in relation to the plane of movement 4 of the card 2. On the inner side of the closure element 7 there is likewise an inner run-in slope 15, which makes it possible for the card 2 to push aside the closure element 7 as it leaves the device. The leaf spring 11, carrying the closure element 7, is offset approximately 6 mm in relation to the plane of the carrier 13 by being bent away in the direction of the plane of movement 4 of the card 2 and is therefore provided with a prestress that is obtained during operation when it bears against a counter abutment.

In a way corresponding to the preferred use of tachographs, two closures according to the invention are usually arranged on a common carrier 13, as shown in FIG. 3.

Figure 4:
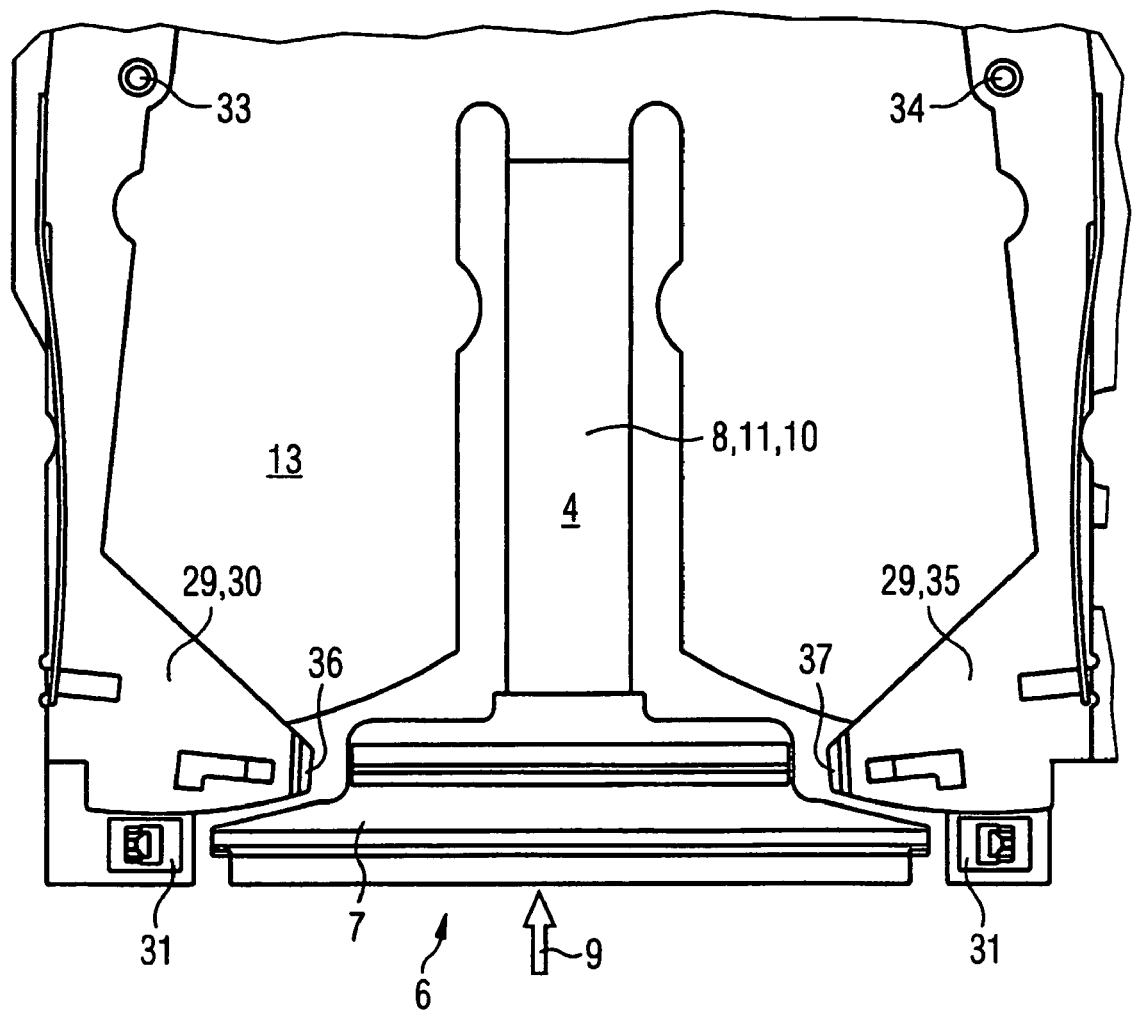
FIG. 4 shows a plan view of a closure according to the invention with a locking unit in the non-locked position.
Figure 5:
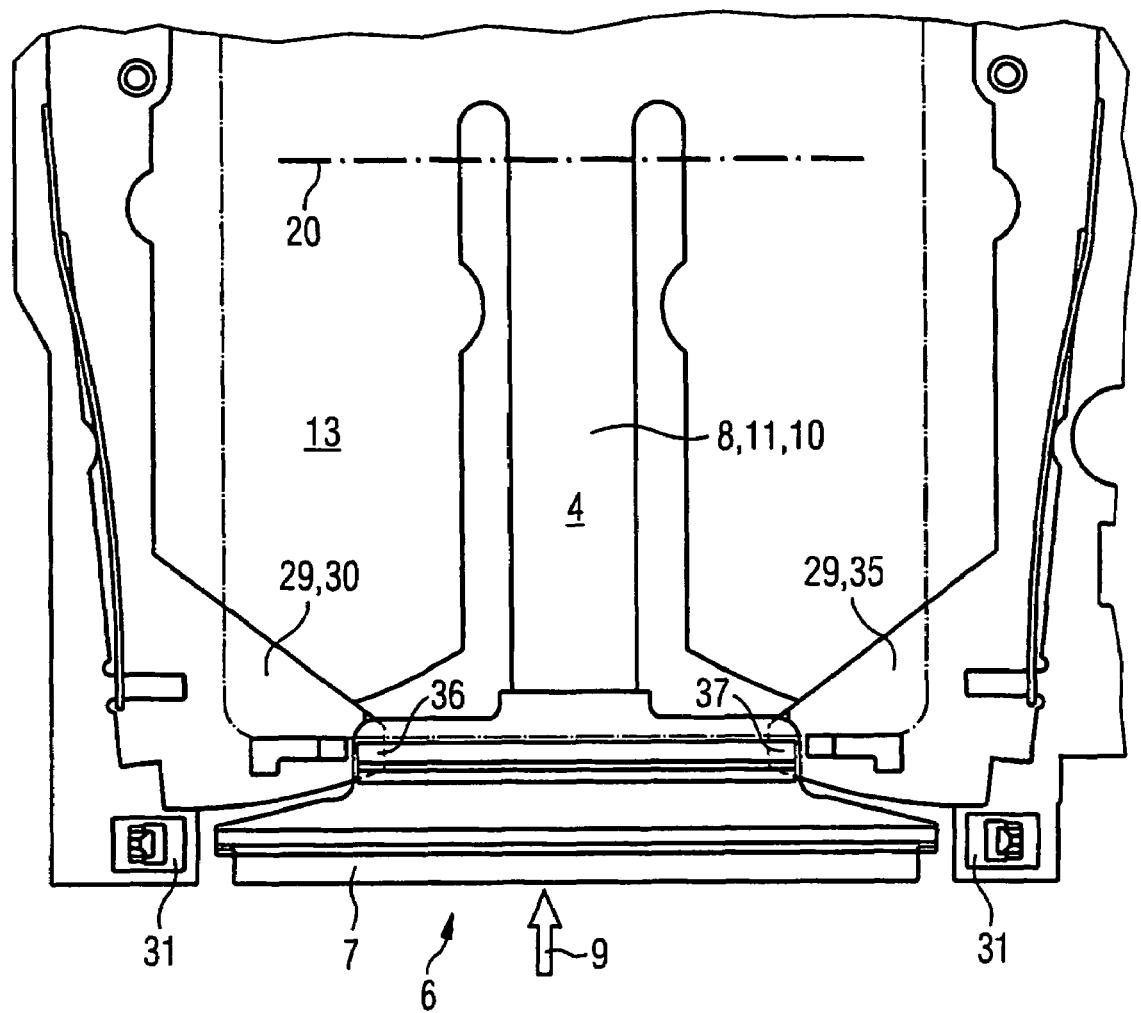
FIG. 5 shows a plan view of a closure according to the invention with a locking unit in the locked position.

In FIGS. 4, 5, a locking unit 29 is represented, provided with the designation 29. In FIG. 4, the locking unit 29 is in a non-locked position and, in FIG. 5, the locking element is locked by means of the locking unit 29. The locking unit 29 has two locking elements 30, 35, which can in each case be pivoted about a third axis of rotation 33, 34. The two locking elements 30, 35 are arranged laterally of the closure 6 on both sides of the plane of movement 4 for a card. The locking elements 35, 30 are respectively provided on the end faces, facing the closure element 7, with a run-in slope 36, 37, which makes it possible for the locking elements 30, 35 to push themselves behind the closure element 7 in a plane between the plane of the closure element 7 and the plane of the carrier 13, so that the closure 6 can no longer spring back into an open position.

In FIG. 6, a sealing unit 32 is represented, which seal has cut-out recesses 38, 39, which correspond to the latching hooks 31. The sealing unit 32, consisting of plastic, encloses the receiving opening 5 for the card in the plane of movement 4 in a U-shaped manner and is provided on the side facing the plane of movement 4 with a seal 40. The seal 40 integrally combines a first seal 21, extending in the longitudinal direction of the receiving opening 5, and two second seals 22, extending in the transverse direction of the receiving opening 5. The seal 40 is fitted in an interlocking manner in a corresponding receiving formation 41. The cross section of the seal 40 that is represented in FIG. 8 shows the arrangement with a first sealing lip 42 for sealing with respect to a front panel 25. As FIGS. 9, 10 illustrate, the region of the second seal 22 has a chamber-like clearance with a second sealing lip 43, which is formed in a resilient manner and faces in the inward direction 9. The second sealing lip 43 seals with respect to a laterally protruding sealing surface 44 of the closure element, so that no splash water can penetrate laterally of the closure element 7 either.

Figure 12:
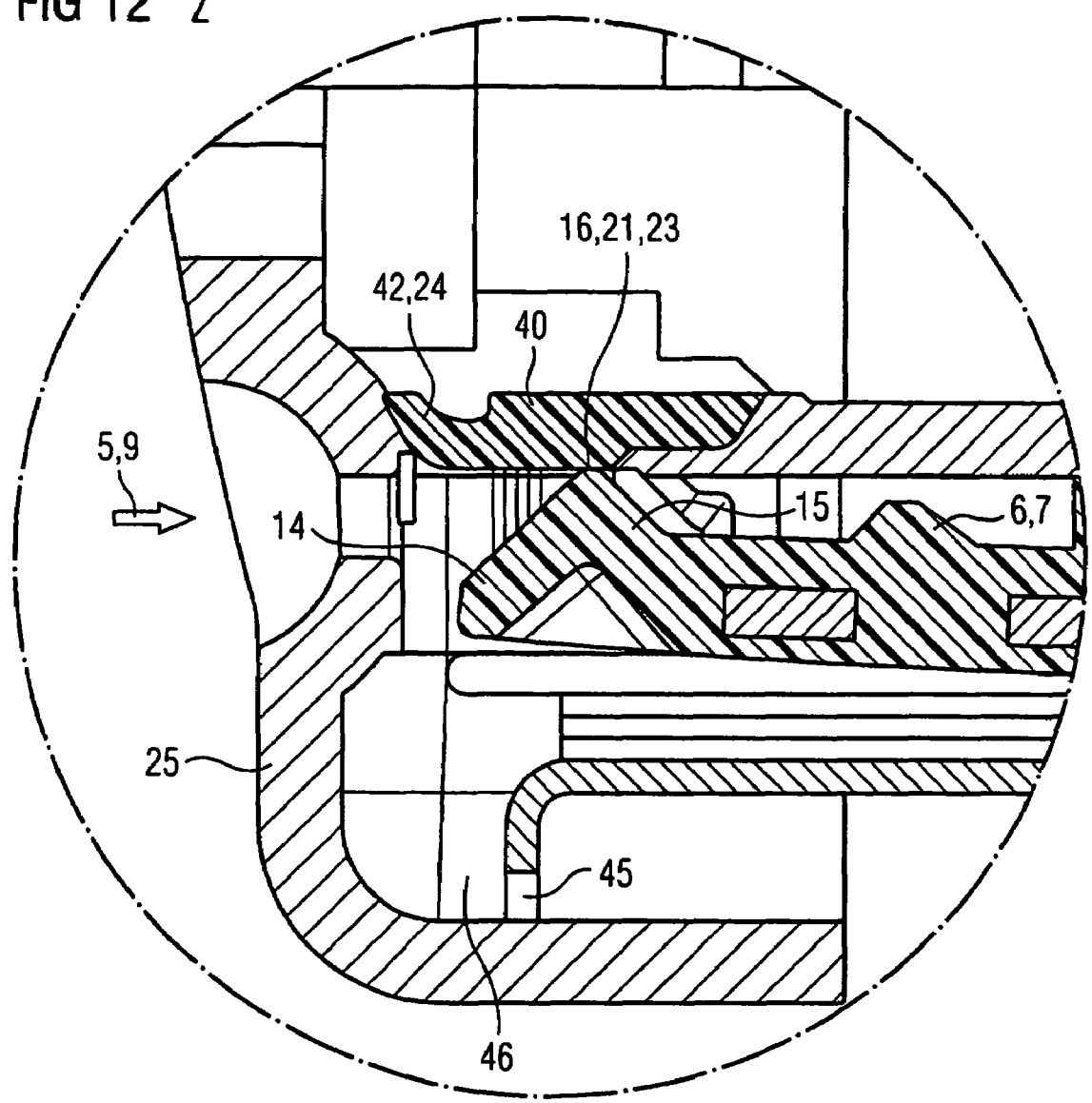
FIG. 12 shows a detailed representation according to the detail Z indicated in FIG. 11.

As FIGS. 11, 12 illustrate in the detail of the partial representation of a card receiving device 1, if it is installed in accordance with regulations, the closure element 7 of the closure 6 closes with a movement from the bottom upward, that is to say substantially counter to the direction of gravitational force, and comes to bear against the first seal 21 in the closed position. The installation position may also be inclined by up to 30° according to the invention. The resilient closure 7 thereby prevents the card from falling out when it is ejected, by means of clamping. On account of the wedge shape of the closure element 7, the bearing contact is substantially linear. On account of this arrangement, the seal 40 describes a substantially inverted U shape around the receiving opening 5. In this way, splash water penetrating through a receiving recess 28 of the front panel 25 that corresponds to the receiving opening 5 can, under the driving effect of gravitational force, run into a drainage channel 46, located under the receiving opening 5 behind the front panel 25 on the rear side 26, and from there leave the moisture-sensitive region from a drain 45. The portion that seals with respect to the front panel 25 is formed as a softer region 24 of the seal 40 and is softer than an adjacent, harder region 23, arranged as a counter abutment of the closure element. These two regions 23, 24 are integrally connected to each other.

The invention claimed is:

1. A card receiving device for a tachograph in a motor vehicle of a flat construction arranged to completely draw in a card in a plane of movement, the device comprising:

an elongate receiving opening through which the card reaches the card receiving device, a closure comprising a closure element extending in a longitudinal direction of the receiving opening and blocking the receiving opening in a closed position of the closure, the closure element further comprising means for moving in a direction normal to a plane of movement within a travel required for reception of the card, and a seal comprising a first seal and a second seal, wherein the closure element bears in the closed position against the first seal extending in the longitudinal direction of the receiving opening, wherein the closure element bears in the closed position against the second seal arranged on both sides of the receiving opening in a transverse direction of the receiving opening, wherein the closure element is attached to an end on an input side of a leaf spring of an elongate configuration, so that the closure element is resiliently mounted in a direction normal to the plane of movement within the travel required for the reception of the card, and wherein the closure element describes a rotation about a first axis of rotation running parallel to the plane of movement and through a fastening of the other end of the leaf spring.

2. The card receiving device according to claim 1, wherein the leaf spring is arranged substantially in a plane parallel to the plane of movement.

3. The card receiving device according to claim 1, wherein the closure element is formed integrally with the leaf spring.

4. The card receiving device according to claim 1, wherein the leaf spring is formed as part of a carrier carrying further components.

5. The card receiving device according to claim 1, wherein the closure element has on an input side an outer run-in slope for the card to be inserted that extends in the longitudinal direction of the receiving opening.

6. The card receiving device according to claim 1, wherein the closure element has an inner run-in slope for the card to be pushed out that extends in the longitudinal direction of the receiving opening.

7. The card receiving device according to claim 1, wherein:
in the closed position, the closure element is arranged to bear in an elastically prestressed manner against a counter abutment, and during an inward movement into the card receiving device the card is arranged between the counter abutment, and the closure element is facing the closure element with a first flat side and is facing the counter abutment with a second flat side and the closure element is stressed against the first flat side of the card.

8. The card receiving device according to claim 1, wherein the card receiving device further comprises a set of contacts arranged to contact the card and further arranged on the other side of the plane of movement than the closure Element.

9. The card receiving device according to claim 1, wherein the first axis of rotation is arranged away from the closure element in an inward direction by at least ten times the usual travel of the closure.

10. The card receiving device according to claim 1, wherein the first axis of rotation is arranged so far away from the closure element that the closure element closes the receiving opening in a manner similar to a guillotine.

11. The card receiving device according to claim 1, wherein the card receiving device further comprises a front panel with a rear side, a visible side and a receiving recess in a region of the receiving opening for the card, wherein a cross section of the seal has a harder region, which extends in the longitudinal direction and against which the closure element bears in the closed position, and a softer region, which extends in the longitudinal direction and bears against the rear side of the front panel.

12. The card receiving device according to claim 11, wherein the front panel comprises underneath the receiving recess at least one drainage opening.

13. The card receiving device according to claim 1, wherein the closure element has a cross section that tapers in a form of a wedge or runs to a point in relation to the seal, so that a substantially linear contact is obtained between the seal and the closure element in the closed position.

14. The card receiving device according to claim 1, wherein the card, receiving device has a locking unit arranged to lock the closure in the closed position.

15. The card receiving device according to claim 14, wherein the locking unit is arranged to additionally press the closure element against the seal in the locked position.

16. The card receiving device according to claim 14, wherein the leaf spring is arranged to be blocked in the closed position of the closure by means of a locking element of the locking unit.

17. The card receiving device according to claim 14, wherein a locking element of the locking unit is arranged to be movable in a plane substantially parallel to the card.

18. The card receiving device according to claim 1, further comprising means for automatically drawing in the card.

19. The card receiving device according to claim 1, further comprising means for automatically withdrawing the card.

* * * * *